US005558710A

United States Patent [19]

Baig

[11] Patent Number: 5,558,710
[45] Date of Patent: * Sep. 24, 1996

[54] GYPSUM/CELLULOSIC FIBER ACOUSTICAL TILE COMPOSITION

[75] Inventor: Mirza A. Baig, Des Plaines, Ill.

[73] Assignee: USG Interiors, Inc., Chicago, Ill.

[*] Notice: The portion of the term of this patent subsequent to Jan. 14, 2014, has been disclaimed.

[21] Appl. No.: 287,392

[22] Filed: Aug. 8, 1994

[51] Int. Cl.$^6$ ..................................................... C04B 11/00
[52] U.S. Cl. ........................ 106/780; 106/772; 106/779; 106/122; 106/DIG. 2; 252/62; 428/703
[58] Field of Search .................................. 106/779, 772, 106/780, 711, 214, 122, DIG. 2; 252/62; 428/703

[56] References Cited

U.S. PATENT DOCUMENTS

| 1,769,519 | 7/1930 | King et al. | |
|---|---|---|---|
| 1,996,032 | 3/1935 | Roos | 106/36 |
| 1,996,033 | 3/1935 | King | 106/36 |
| 2,772,603 | 12/1956 | Waggoner | 92/39 |
| 2,884,380 | 4/1959 | Cook et al. | 252/62 |
| 3,090,699 | 5/1963 | Bulson | 117/62.2 |
| 3,228,825 | 1/1966 | Waggoner | 162/145 |
| 3,244,632 | 4/1966 | Schulz | 252/62 |
| 3,246,063 | 4/1966 | Podgurski | 264/112 |
| 3,307,651 | 3/1967 | Podgurski | 181/33 |
| 3,367,871 | 2/1968 | Mueller et al. | 252/62 |
| 3,498,404 | 3/1970 | Roberts | 181/33 |
| 3,510,394 | 5/1970 | Cadotte | 162/145 |
| 3,804,706 | 4/1974 | Kurashige | 162/109 |
| 4,062,721 | 12/1977 | Guyer et al. | 162/101 |
| 4,126,512 | 11/1978 | Hill | 162/171 |
| 4,530,653 | 7/1985 | Ishii | 425/363 |
| 4,587,278 | 5/1986 | Dotzauer et al. | 523/200 |
| 4,613,627 | 9/1986 | Sherman et al. | 521/68 |
| 4,735,756 | 4/1988 | Rausch | 264/86 |
| 4,861,822 | 8/1989 | Keskey et al. | 524/559 |
| 4,863,979 | 9/1989 | Beyersdorf et al. | 524/14 |
| 4,925,529 | 5/1990 | Dotzauer et al. | 162/152 |
| 4,941,949 | 7/1990 | Luszczak | 162/310 |
| 4,963,603 | 10/1990 | Felegi | 162/145 |
| 5,013,405 | 5/1991 | Izard | 162/101 |
| 5,022,963 | 6/1991 | Porter et al. | 162/116 |
| 5,047,120 | 9/1991 | Izard et al. | 162/101 |
| 5,134,179 | 7/1992 | Felegi | 524/13 |
| 5,171,366 | 12/1992 | Richards et al. | 106/780 |
| 5,250,153 | 10/1993 | Izard et al. | 162/152 |
| 5,277,762 | 1/1994 | Felegi et al. | 162/145 |
| 5,320,677 | 6/1994 | Baig | 106/780 |
| 5,395,438 | 3/1995 | Baig et al. | 106/214 |

FOREIGN PATENT DOCUMENTS

| 2383899 | 3/1977 | France . |
| 34 38 388.3 | 10/1984 | Germany . |
| 675044 | 7/1977 | U.S.S.R. . |

Primary Examiner—Mark L. Bell
Assistant Examiner—Michael Marcheschi
Attorney, Agent, or Firm—John M. Lorenzen; David F. Janci

[57] ABSTRACT

An acoustical tile composition based on a gypsum/cellulosic fiber composition which can replace all or a portion of the mineral wool normally present in acoustical ceiling tiles. The gypsum/cellulosic fiber composition is combined with a lightweight aggregate material and a binder to form a composition which is used in a water-felting process to manufacture acoustical ceiling tiles and panels. The preferred source of the cellulosic fiber is a composite gypsum/cellulose fiber material which is prepared by mixing the gypsum and cellulosic fiber material with sufficient water to form a dilute slurry which is then heated under pressure to calcine the gypsum, converting it to an alpha calcium sulfate hemihydrate. The resulting composite material comprises cellulosic fibers physically interlocked with calcium sulfate crystals. Another source of both gypsum and cellulosic fibers is waste (scrap) gypsum wallboard. Expanded perlite is the preferred lightweight aggregate material.

42 Claims, No Drawings

GYPSUM/CELLULOSIC FIBER ACOUSTICAL TILE COMPOSITION

FIELD OF THE INVENTION

This invention relates to acoustical tile compositions useful in manufacturing acoustical tiles and panels for ceiling applications. More particularly, this invention relates to acoustical tile compositions based on a gypsum/cellulosic fiber composition which can replace all or a portion of the mineral wool normally present in acoustical ceiling tiles. The invention also relates to a novel gypsum/cellulosic fiber/lightweight aggregate material composition which is used in a water-felting process to manufacture acoustical ceiling tiles and panels.

BACKGROUND OF THE INVENTION

The water-felting of dilute aqueous dispersions of mineral wool and lightweight aggregate is a commercial process for manufacturing acoustical ceiling tile. In this process, a dispersion of mineral wool, lightweight aggregate, binder and other ingredients as desired or necessary is flowed onto a moving foraminous support wire, such as that of a Fourdrinier or Oliver mat forming machine for dewatering. The dispersion dewaters first by gravity and then vacuum suction means; the wet mat is dried in heated convection drying ovens, and the dried material is cut to the desired dimensions and optionally top coated, such as with paint, to produce acoustical ceiling tiles and panels.

For many years, acoustical ceiling tile has also been made by a wet pulp molded or cast process such as described in U.S. Pat. No. 1,769,519. According to the teaching of this patent, a molding composition comprising granulated mineral wool fibers, fillers, colorants and a binder, in particular a starch gel, is prepared for molding or casting the body of the tile. This mixture or composition is placed upon suitable trays which have been covered with paper or a metallic foil and then the composition is screeded to a desired thickness with a screed bar or roller, A decorative surface, such as elongated fissures, may be provided by the screed bar or roller. The trays filled with the mineral wool pulp or composition are then placed in an oven to dry or cure the composition. The dried sheets are removed from the trays and may be treated on one or both faces to provide smooth surfaces, to obtain the desired thickness and to prevent warping. The sheets are then cut into tiles of a desired size.

In my U.S. Pat. No. 5,320,677, issued Jun. 14, 1994, disclose a composite material and method for making it wherein ground gypsum is calcined under pressure in a dilute slurry in the presence of a cellulosic fiber. The uncalcined, ground gypsum and the cellulosic fiber are mixed together with sufficient water to form a dilute slurry which is then heated under pressure to calcine the gypsum, converting it to calcium sulfate alpha hemihydrate. The resulting co-calcined material consists of the cellulosic fiber physically interlocked with calcium sulfate crystals. This interlocking not only creates a good bond between the calcium sulfate and the cellulosic fiber, it also prevents migration of the calcium sulfate away from the cellulosic fiber when the alpha hemihydrate is subsequently rehydrated to the dihydrate (gypsum).

The co-calcined gypsum/cellulosic fiber material can be dried immediately before it cools to provide a stable, rehydratable alpha hemihydrate composite for later use. Alternatively, the co-calcined material can be directly converted into a usable product by separating the excess water which is not needed for rehydration, forming the composite particles into a desired shape or form, and then rehydrating the particles to a set and stabilized gypsum/cellulosic fiber composite material.

Mineral wool acoustical tiles are very porous which is necessary to provide good sound absorption. The prior art (U.S. Pat. Nos. 3,498,404; 5,013,405 and 5,047,120) also discloses that mineral fillers, such as expanded perlite, may be incorporated into the composition to improve sound absorbing properties and to provide light weight.

It is an object of this invention to provide an acoustical tile composition in which some or all of the mineral wool is replaced by a gypsum/cellulosic fiber composition.

It is another object of this invention to provide a mineral wool-free acoustical tile composition having acoustical properties comparable to the mineral wool tiles made by a water-felting process.

It is a further object of this invention to provide an acoustical tile composition consisting essentially of gypsum, cellulosic fiber, a lightweight aggregate material and a binder.

These and other objects will be apparent to persons skilled in the art in view of the description which follows.

SUMMARY OF THE INVENTION

It has been discovered that a composition consisting essentially of gypsum, cellulosic fiber, a lightweight aggregate material and a binder can be used to manufacture acoustical ceiling tiles and panels employing equipment and procedures currently used in a water-felting process to produce acoustical tiles and panels. The composition may also contain a reduced amount of mineral wool or it may contain no mineral wool. The dried product can be formed into tiles or panels having comparable acoustical properties with commercially available acoustical tiles. A particularly preferred composition employs a gypsum/cellulosic fiber composite material in which the gypsum and cellulosic fiber are co-calcined under pressure to physically interlock the cellulosic fiber with the calcium sulfate crystals. The acoustical tiles made from the compositions of this invention have acceptable physical properties for use in suspended ceiling systems. In addition, the compositions which contain waste newsprint and/or waste (scrap) gypsum wallboard are environmental friendly.

DETAILED DESCRIPTION OF THE INVENTION

The acoustical tile compositions of this invention are based on using a gypsum/cellulosic fiber composition as a replacement, either partial or complete, for mineral wool in manufacturing ceiling tiles or panels using a water-felting process. In addition to the gypsum and cellulosic fiber, the composition also contains a lightweight aggregate material and a binder, and it may also contain other additives, such as clay, flocculant and surfactant, normally included in acoustical ceiling tile formulations. As noted above, the composition may contain some mineral wool (in reduced amount), however, it has been found that the compositions of this invention can be used to make mineral wool-free acoustical tiles and panels.

One of the key ingredients in the novel acoustical tile composition of this invention is gypsum (calcium sulfate dihydrate). The solubility of the gypsum in the processing slurry enables the gypsum to function as a flocculant in the formulation. This flocculating function provides uniform distribution of fine particles (clay, gypsum, perlite and starch) in the wet mat during the processing. In the absence of this flocculating action, the fine and high density particles tend to migrate to the bottom of the mat during processing which adversely affects drainage of the water from the wet mat. The presence of gypsum in the formulation also provides deagglomeration of the mineral fiber (if present) and cellulose fiber slurries. The de-agglomeration or dispersant function provided by the gypsum enables the processing of a higher slurry consistency (% solids) which reduces the amount of water to be removed from the mat and increases the production rate. The higher slurry consistency also enables the entrainment of more air during formation of the mat, and this improves the sound absorption property in the dried product.

In addition to the processing benefits provided by the gypsum, it also improves the properties of the acoustical tile. The presence of the gypsum, replacing the mineral wool fiber (partial or complete) in the formulation, provides a significant improvement in the surface hardness of the panels. The improved surface hardness of the ceiling panels also provides good surface texturing (e.g. fissuring, perforation, etc.). The higher level of cellulose fiber may also contribute to these improvements. The surface smoothness of the acoustical panels may also be improved by the gypsum whereby sanding of the surface after drying may be eliminated. The gypsum in the panels also provides improved fire properties.

It has also been found that the gypsum/cellulosic fiber formulation does not springback (swell) after the wet pressing and drying operations compared to formulations containing mineral fiber. The non-swelling characteristics of the mineral wool-free ceiling tile indicates that the dry mat thickness can be precisely determined or controlled during the wet pressing operation, thereby eliminating the need to apply a filler coat or to sand the dry mat to control the thickness for finishing the panel.

The gypsum source may be calcium sulfate dihydrate, either uncalcined or calcined to hemihydrate and then rehydrated. Alternatively, the gypsum source may be calcium sulfate hemihydrate (with or without co-calcining) or calcium sulfate anhydrite. As more fully discussed below, the gypsum may be co-calcined with a cellulose fiber material to form a composite material of cellulose fibers interlocked with calcium sulfate crystals.

Another key ingredient in the novel acoustical tile compositions of this invention is the cellulosic fiber. Several types of cellulosic fiber have been evaluated in these compositions. It is well known to use newsprint in acoustical tile formulations, and both hammermilled and hydropulped newsprint have been evaluated in these compositions. Refined paper fibers and wood fiber may also be used as the source of the cellulosic fiber, however, it has been found that ceiling tiles made with wood fiber, either softwood or hardwood, are more difficult to cut with a knife at the installation site. Furthermore, wood fibers are a more expensive source of the cellulosic fiber.

A preferred source of the cellulosic fiber is a composite gypsum/cellulose fiber material which has been co-calcined as disclosed in U.S. Pat. No. 5,320,677. As disclosed therein, which disclosure is incorporated herein by reference thereto, uncalcined gypsum and either wood or paper fibers are mixed together with sufficient water to form a dilute slurry which is then heated under pressure to calcine the gypsum, converting it to an alpha calcium sulfate hemihydrate. The resulting composite material comprises cellulosic fibers physically interlocked with calcium sulfate crystals. The composite material can be dried immediately before it cools to provide a stable, but rehydratable calcium sulfate hemihydrate, or the composite material slurry can be used directly in manufacturing the acoustical tile. It has been found that the use of co-calcined gypsum/cellulose fiber composite material provides an acoustical tile composition having greater mat solids retention and better wet lap strength, however, it does drain slower and is harder to cut with a knife than tiles made with gypsum physically blended with paper fiber (newsprint), especially if the longer and stronger wood fibers are used.

Another source of both gypsum and cellulosic fibers is waste (scrap) gypsum wallboard. It has been found that the scrap wallboard can be ground into gypsum particles and paper fibers which can be physically mixed with the other ingredients in an acoustical formulation to provide a slurry useful in a water-felting process for preparing a ceiling tile. Alternatively, the ground scrap wallboard can be used as a feed material in a co-calcining process, and the co-calcined composite gypsum/paper fiber material can be used in a formulation for preparing a ceiling tile by water-felting.

A third key ingredient in the novel acoustical tile compositions of this invention is a lightweight aggregate material. Expanded perlite is preferred for its low cost and performance. This is not a novel ingredient, for it is well known in the art to use expanded perlite in acoustical tile compositions. The expanded perlite provides porosity in the composition which enhances acoustical properties. It has been found that a medium grade expanded perlite provides sufficient porosity and acceptable texturability. An expanded perlite material commercially available from Silbrico Corporation under the designation 3-S perlite has been found acceptable. The medium grade expanded perlite contains perlite particles that are similar in size to granulated mineral wool. Equivalents of the expanded perlite such as vermiculite, glass beads, diatomite or exfoliated clays may also be used as substitutes for the perlite or in combination therewith.

The fourth key ingredient, which also is not novel in acoustical compositions, is a binder. It is well known to use starch as a binder in mineral wool based acoustical tiles. A starch gel may be prepared by dispersing starch particles in water and heating the slurry until the starch is fully cooked and the slurry thickens to a viscous gel. A portion of the cellulosic fibers may be incorporated into the starch slurry prior to cooking. The cooking temperature of the starch slurry should be closely monitored to assure full swelling of the starch granules. A representative cooking temperature for corn starch is about 180° F. (82° C.) to about 195° F. (90° C.). Starch may also be used as a binder without pre-cooking the starch to form a gel.

A latex binder may be used in place of the starch or in combination with the starch binder. Many of the latex binders useful in acoustical ceiling formulations are disclosed in U.S. Pat. No. 5,250,153. As set forth therein, one of the problems with acoustical panels employing a starch binder is excessive sag, especially in high humidity conditions. It is well known in the art to use thermoplastic binders (latexes) in acoustical tiles based on mineral wool. These latex binders may have a glass transition temperature ranging from about 30° C. to about 110° C. Examples of latex binders include polyvinyl acetate, vinyl acetate/acrylic emulsion, vinylidene chloride, polyvinyl chloride, styrene/acrylic copolymer and carboxylated styrene/butadiene. A kraft paper gel formed by refining the paper fibers may also be used as a binder.

In addition to the four principal ingredients, the acoustical compositions of this invention may also contain inorganic fillers such as clay, mica, wollastonite, silica and other lightweight aggregates, surfactants and flocculants. These ingredients are well known in acoustical tile compositions.

The acoustical tile compositions of this invention consist essentially of gypsum, cellulose fiber, a lightweight aggregate material and a binder which can be present, preferably, in the following amounts:

| Ingredient | Weight Percent |
| --- | --- |
| Gypsum | 15–45% |
| Cellulose Fiber | 13–30% |
| Lightweight Aggregate | 25–60% |
| Binder | 3–15% |

In some of the examples which follow, soluble gypsum was added to the slurry water prior to incorporating the dry ingredients into the slurry. The reason for this prior addition of gypsum to the slurry water is that gypsum dissolves in water, and the prior addition of gypsum to the slurry water gives better retention of the dry gypsum ingredient in the dried product. Otherwise, it may be necessary to increase the amount of dry gypsum in the ingredient mix to compensate for gypsum going into solution.

The gypsum and wood fiber were calcined together in a reactor at 15% solids consistency. The calcination was carried out in accordance with the procedures disclosed in U.S. Pat. No. 5,320,677. After co-calcining, excess water was removed from the composite material by applying a vacuum thereto, afterwhich the composite material was allowed to hydrate fully to calcium sulfate dihydrate (gypsum) prior to drying at 120° F. overnight to constant weight. Another batch of gypsum/wood fiber was co-calcined as previously described, except that after removal of the excess water by vacuum, the composite material was immediately dried at 250° F. for 30 minutes to avoid hydration, followed by drying at 120° F. overnight to constant weight. In this composite material, the calcium sulfate was in the hemihydrate form. After drying, the gypsum/wood fiber composites, in both dihydrate and hemihydrate forms, were broken down in a twin shell blender prior to incorporation into the acoustical tile composition.

In the water-felting process used to make the acoustical tiles, the feed slurry during mat formation was held at 4% solids. This 4% solids consistency was also used in making the control tile which contained 100% mineral fiber and no gypsum/wood fiber. The following formulations (in weight percent) were used to make the tiles:

TABLE 1

| Ingredients | Control | | Experimental | | |
| --- | --- | --- | --- | --- | --- |
| | 100% M–F 0% G/WF | 75% M–F 25% G/WF | 50% M–F 50% G/WF | 25% M–F 75% G/WF | 0% M–F 100% G/WF |
| Mineral Fiber | 37.58 | 28.18 | 18.79 | 9.39 | 0 |
| Gypsum | 0 | 7.98 | 15.97 | 23.9 | 31.94 |
| Wood Fiber | 0 | 1.41 | 2.82 | 4.22 | 5.64 |
| Expanded Perlite | 34.83 | 34.83 | 34.83 | 34.83 | 34.83 |
| Newspaper | 15.91 | 15.91 | 15.91 | 15.91 | 15.91 |
| Total Cellulosic Fiber | 15.91 | 17.32 | 18.73 | 20.13 | 21.55 |
| CTS-1 Clay | 3.54 | 3.54 | 3.54 | 3.54 | 3.54 |
| Starch | 8.01 | 8.01 | 8.01 | 8.01 | 8.01 |
| Flocculant | 0.06 | 0.06 | 0.06 | 0.06 | 0.06 |
| Surfactant | 0.08 | 0.08 | 0.08 | 0.08 | 0.08 |

EXAMPLE 1

Acoustical ceiling tiles were prepared to evaluate replacing mineral fiber in a conventional water-felted formulation and process. The mineral fiber was replaced with gypsum and wood fiber at 25, 50, 75 and 100% levels. Some tiles were made in which the gypsum and wood fiber were co-calcined prior to incorporation into the acoustical formulation, and other tiles were made in which the gypsum and wood fiber were just physically mixed with the other ingredients without co-calcining. The ratio of gypsum to wood fiber was 85:15 percent by weight in all formulations.

The wood fiber was a softwood obtained from the International Paper Pilot Rock facility. The expanded perlite was Silbrico Corporation 3-S grade. In addition to the wood fiber, cellulosic fibers were also supplied by shredded newspaper. 1500 grams of water was added to the required amount of newspaper and mixed at high speed in an industrial blender. Corn starch was used as the binder. The flocculant was GEN DRIV 162, and 4 grams of the flocculant were added to 1000 milliliters of deionized water and mixed for at least 2 hours. The surfactant was NEODOL 25-3.

The evaluation procedures included board formation and processing, drainage time, pressing, drying and the effect on the physical properties of the acoustical tiles. In general, there was no significant difference in the formation of the mat. After mixing all of the ingredients at a 4% solids consistency, the slurry was poured in a Tappi Box and gently mixed with a 12 inch by 12 inch perforated plunger to disperse the solids uniformly. After the mat was formed in the box, vacuum was applied to the wet mat. It took about 30 seconds for the vacuum to reach 20 inches of mercury, after which the vacuum was released and two drainage times were recorded. The first drainage time was when the water totally disappeared from the surface of the mat, and the second drainage time was when the vacuum dial indicator dropped to 5 inches of mercury. At this stage, the vacuum system was turned off, and the wet mat was removed from the Tappi Box and weighed prior to pressing. The vacuum dewatered boards were pressed to ⅝ inch thickness and dried.

The wet mats were dried in an oven at 600° F. for 30 minutes, and thereafter, the oven temperature was lowered to 350° F. and the tiles were dried for an additional 90 minutes. Prior to drying, a study was performed to determine whether the wet mats could be dried without calcining the gypsum therein. It was determined that the mats could be dried in an oven as recited above without calcining the gypsum to hemihydrate or anhydrite.

After drying, all of the test specimens were cut and subjected to 75° F./50% Relative Humidity conditions for at least 24 hours prior to testing. The specimens were tested for the following:

1) density, thickness and MOR strength
2) acoustical properties (NRC)
3) dimensional stability (water absorption)

The following results were recorded (results are based on an average of 4 specimens in each set unless otherwise indicated):

TABLE 1D

Density, Thickness, Strength (MOR)

| | No. of Samples | % MF/WF | | Thickness inch | Density (lb./ft$^3$) | MOR (psi) |
|---|---|---|---|---|---|---|
| Control (100% MF) | 29 | 100 | 0 | 0.627 | 10.05 | 53 |
| Gypsum/Wood (Not Co-Calcin.) | 10 | 75 | 25 | 0.600 | 9.86 | 55 |
| | 10 | 50 | 50 | 0.602 | 9.95 | 56 |
| | 10 | 25 | 75 | 0.591 | 10.05 | 63 |
| | 9 | 0 | 100 | 0.590 | 10.15 | 83 |
| Dihydrate Composite (Co-Calcin.) | 10 | 75 | 25 | 0.630 | 10.05 | 48 |
| | 10 | 50 | 50 | 0.593 | 9.99 | 57 |
| | 6 | 25 | 75 | 0.591 | 9.64 | 57 |
| | 10 | 0 | 100 | 0.559 | 10.22 | 63 |

TABLE 1A

Gypsum & Wood Fiber (No Co-Calcination)

| | Drainage Time (sec.) | Thickness After Vacuum (in.) | % Water Removed (Vacuum) | % Water Removed (pressing) | % Total Water Dried | Dry Board Thick. (in.) | Dry Board Density (lb/ft$^3$) | % Wt. Loss During Processing | Additional Wt. Loss % (gypsum) |
|---|---|---|---|---|---|---|---|---|---|
| Control (100% MF)* | 4.3–11.4 | 1.031 | 80.47 | 80.93 | 79.77 | 0.635 | 10.02 | 5.01 | — |
| 75% MF & 25% G/WF | 4–11 | 1.000 | 80.60 | 82.27 | 79.89 | 0.596 | 9.87 | 10.74 | 5.58 |
| 50% MF & 50% G/WF | 4–11 | 1.000 | 80.55 | 81.85 | 80.52 | 0.592 | 9.87 | 11.45 | 6.45 |
| 25% MF & 75% G/WF | 5.5–12.5 | 0.969 | 81.68 | 82.27 | 80.13 | 0.583 | 9.99 | 11.80 | 6.80 |
| 100% G/WF** | 7.3–13 | 0.938 | 81.52 | 82.69 | 79.97 | 0.582 | 9.95 | 12.20 | 7.20 |

*2 Specimens
**3 Specimens

TABLE 1B

Dihydrate Composite (Co-Calcined)

| | | | | | | | | | |
|---|---|---|---|---|---|---|---|---|---|
| Control | 4.4–11.4 | 1.063 | 80.44 | 82.11 | 78.76 | 0.631 | 9.87 | 5.51 | — |
| 75% MF & 25% GWF | 4.6–10.9 | 1.000 | 78.27 | 80.58 | 80.57 | 0.627 | 9.93 | 9.74 | 4.2 |
| 50% MF & 50 GWF | 5–11 | 0.938 | 81.24 | 82.41 | 79.83 | 0.591 | 9.80 | 12.26 | 6.75 |
| 25% MF & 75% GWF*** | 5.7–11 | 0.938 | 79.68 | 82.03 | 80.77 | 0.590 | 9.67 | 13.40 | 7.89 |
| 100% GWF | 7–11 | 0.938 | 82.24 | 83.14 | 79.90 | 0.559 | 10.00 | 15.23 | 9.72 |

***3 specimens

TABLE 1C

Hemihydrate Composite (Co-Calcined)

| | Drainage Time (sec.) | Thickness After Vacuum (in.) | % Water Removed (Vacuum) | % Water Removed (pressing) | % Total Water Dried | Dry Board Thick. (in.) | Dry Board Density (lb/ft$^3$) | % Wt. Loss During Processing | Additional Wt. Loss % (gypsum) |
|---|---|---|---|---|---|---|---|---|---|
| Control (100% MF) | 4.6–11 | 1.0 | 80.43 | 81.31 | 79.88 | 0.624 | 9.94 | 5.86 | — |
| 75% MF & 25% G/WF | 4.8–10.4 | 1.0 | 80.93 | 81.46 | 80.87 | 0.602 | 9.73 | 11.24 | 5.38 |
| 50% MF & 50% G/WF | 5.6–11.4 | 1.0 | 79.99 | 81.57 | 81.58 | 0.596 | 9.39 | 14.97 | 9.12 |
| 25% MF & 75% G/WF | 6.8–11.3 | 1.0 | 81.98 | 82.63 | 81.06 | 0.573 | 9.48 | 17.58 | 11.72 |
| 100% G/WF | 9.3–13.8 | 1.0 | 82.9 | 83.87 | 79.86 | 0.571 | 9.39 | 18.87 | 13.02 |

TABLE 1D-continued

Density, Thickness, Strength (MOR)

|  | No. of Samples | % MF/WF | Thickness inch | Density (lb./ft$^3$) | MOR (psi) |
|---|---|---|---|---|---|
| Hemihydrate Composite (Co-Calcin.) | 10 | 75 25 | 0.602 | 9.76 | 58 |
|  | 10 | 50 50 | 0.597 | 9.39 | 55 |
|  | 10 | 25 75 | 0.571 | 9.46 | 57 |
|  | 7 | 0 100 | 0.568 | 9.32 | 53 |

TABLE 1E

Acoustical Properties
Dihydrate Composite
Frequency

|  |  | 250 Hz | 500 Hz | 1000 Hz | 2000 Hz | NRC (avg.) |
|---|---|---|---|---|---|---|
| Control | Db Drop | 32 | 27 | 21.5 | 22 |  |
|  | Absorbance | 0.266 | 0.392 | 0.546 | 0.532 | 0.434 |
| 75% MF/25% GWF | Db Drop | 29.5 | 24 | 21 | 21 |  |
|  | Absorbance | 0.326 | 0.476 | 0.562 | 0.560 | 0.481 |
| 50% MF/50% GWF | Db Drop | 29 | 24.5 | 20 | 19.5 |  |
|  | Absorbance | 0.332 | 0.469 | 0.599 | 0.606 | 0.501 |
| 25% MF/75% GWF | Db Drop | 29.5 | 22.5 | 21.5 | 19.5 |  |
|  | Absorbance | 0.332 | 0.518 | 0.546 | 0.613 | 0.502 |
| 100% GWF | Db Drop | 29 | 23 | 18.5 | 19 |  |
|  | Absorbance | 0.339 | 0.503 | 0.636 | 0.621 | 0.525 |

TABLE 1F

Dimensional Stability
Dihydrate Composite (Avg. 6 Samples)

|  | % H$_2$O Absorption 1 - Hour | % H$_2$O Absorption 4 - Hours | % Thickness Increase 4 - Hours |
|---|---|---|---|
| Control | 387.96 | 404.14 | −0.540 |
| 75% MF/25% GWF | 386.48 | 396.15 | 0.035 |
| 50% MF/50% GWF | 390.23 | 399.90 | −0.412 |
| 25% MF/75% GWF | 388.10 | 400.66 | −0.066 |
| 100% GWF | 388.61 | 400.50 | −0.121 |

The drainage time was not affected when 25% of the mineral fiber was replaced by gypsum and wood fiber; however, the drainage was slightly adversely affected as the gypsum/wood fiber level increased, especially at 100% hemihydrate composite. The thickness of the dewatered mat slightly decreased when the gypsum/wood fiber level increased.

The difference in moisture content, after vacuum dewatering and pressing, was insignificant. The thickness of all of the wet mats was controlled at 0.55 inches during pressing. It appeared that wet pressing only controls the thickness of the mat and does not dewater the mat.

The drying data indicates that some gypsum filtered through the screen with excess water during the mat formation and vacuum dewatering. The average weight loss in the control mats was about 5.5%, whereas the weight loss in the mats containing the gypsum/wood fiber was substantially greater. Gypsum settled in the bottom of the mats during mat formation. The dried tiles containing the gypsum/wood fiber were also slightly warped, and the warpage was severe when the mineral filler was totally replaced with the uncalcined gypsum/wood fiber. However, there was no warpage in the tiles made by replacing the mineral fiber with a co-calcined dihydrate or hemihydrate composite.

The MOR strength of the tiles containing gypsum/wood fiber was comparable to the control, even though the density was slightly lower (probably due to the gypsum lost during the mat formation). The thickness of the tiles containing the gypsum/wood fiber was lower due to the low specific volume for gypsum, which did not spring back during drying as did the 100% mineral fiber tiles.

Duplicate samples of Control and experimental tiles with mineral fiber replaced by gypsum/wood fiber dihydrate composite (co-calcined) were tested for NRC using the Impedance tube method. The samples were not perforated, fissured or painted. In general, the NRC ratings for the tiles containing the gypsum/wood fiber were better than the control, especially for the tiles wherein all of the mineral fiber was replaced.

In the test for dimensional stability, there was no significant difference in the one and four hour water absorption values. As noted previously, very little water (about 2%) was removed from the tiles during wet pressing. About 78% moisture was evaporated during drying, however, this produced excessive pores in the tiles. However, during the dimensional stability test, water penetrated into the pores of the tiles resulting in high water absorption.

EXAMPLE 2

Waste (scrap) gypsum wallboard was evaluated as a source of gypsum and paper fiber (co-calcined) in acoustical ceiling tiles. The waste wallboard was ground into small particles. Though some large paper pieces were present, these were broken during the calcining and the agitation required to keep the slurry in suspension during the calcining. The scrap gypsum wallboard slurry was co-calcined with additional waste (hydropulped) newspaper, whereby the slurry consisted of 15% dry weight of paper fiber and 85% by weight of gypsum. These were co-calcined at a 15% solids consistency, and the calcination was carried out as disclosed in U.S. Patent No. 5,320,677.

After the calcination, the gypsum/paper fiber composite material was discharged from the reactor with the gypsum in its hemihydrate form. Two acoustical ceiling tiles were made by dewatering (vacuum) the slurry, after mixing with expanded perlite and corn starch, and then pressing the wet mat to remove additional excess water and to control the thickness of the tiles prior to drying. The tiles were dried at 600° F. for 30 minutes, followed by 90 minutes at 650° F.

The following tables represent the formulation and the recorded MOR strength:

TABLE 2A

| Ingredient | Tile NO. 1 Wgt. (gms.) | Tile NO. 1 Wgt. % | Tile NO. 2 Wgt. (gms.) | Tile NO. 2 Wgt. % |
|---|---|---|---|---|
| Gypsum (hemihydrate) | 158.1 | 39.4 | 607.8 | 66.4 |
| Waste Paper | 85.9 | 21.4 | 167.0 | 18.3 |
| Expanded Perlite | 137.0 | 34.2 | 120.0 | 13.1 |
| Corn Starch | 20.0 | 5.0 | 20.0 | 2.2 |
| Slurry Consis. (solids %) | 4 | | 6 | |

TABLE 2B

| Tile Sample | Thickness inch | Density (lbs./ft.$^3$) | MOR (psi) |
|---|---|---|---|
| 1a | 0.632 | 7.5 | 68 |
| 1b | 0.619 | 7.5 | 62 |
| 1c | 0.623 | 7.4 | 67 |
| 1d | 0.630 | 7.4 | 78 |
| Avg. | 0.626 | 7.45 | 69 |
| 2a | 0.620 | 20.4 | 168 |
| 2b | 0.645 | 21.1 | 179 |
| 2c | 0.642 | 20.5 | 159 |
| 2d | 0.643 | 20.2 | 154 |
| Avg. | 0.638 | 20.6 | 165 |
| Control (Typical Mineral Fiber Tile) | 0.62 | 11 | 65 |

Tile No. 1 which had a density suitable for use as an acoustical ceiling tile also had a MOR comparable to the control.

EXAMPLE 3

Two ceiling tiles were made using ground scrap gypsum wallboard. There were large paper pieces in the ground wallboard. The ceiling tiles were produced by substituting the ground gypsum wallboard and additional newspaper fiber in a mineral fiber board formulation. The tiles were produced by mixing all of the ingredients for 3 minutes in an aqueous slurry (4% solids). After mixing, the slurry was formed into a wet mat, dewatered under vacuum, and wet pressed to control the thickness and to remove some excess water prior to drying. The processing was comparable to using a mineral fiber formulation except that drainage time was slightly longer. After drying, there were still large pieces of paper in the tiles. The dried tiles were subjected to 75° F./50% relative humidity conditions for at least 24 hours prior to testing for MOR strength.

The following tables represent the formulation and the recorded MOR strength:

TABLE 3A

| Ingredients | Weight (grams) | Weight % |
|---|---|---|
| Gypsum (scrap board) | 167.696 | 41.924 |
| Paper Fiber (scrap board) | 10.704 | 2.676 |
| Newspaper Fiber (additional) | 64.0 | 16.0 |
| Total Paper Fiber | 74.704 | 18.676 |
| Expanded Perlite | 120 | 30 |
| Clay (CTS-1) | 17.6 | 4.4 |
| Starch | 20 | 5 |
| Flocculant (Gendriv) | | 0.06 |
| Surfactant (Neodol 25-3) | | 0.08 |

TABLE 3B

| Tile Sample | Thickness (inch) | Density (lbs./ft.$^3$) | MOR (psi) |
|---|---|---|---|
| 1 a | 0.578 | 10.2 | 46 |
| 1 b | 0.570 | 10.4 | 55 |
| 1 c | 0.565 | 10.4 | 45 |
| 1 d | 0.572 | 10.1 | 43 |
| 1 e | 0.590 | 10.4 | 47 |
| Avg. | 0.575 | 10.3 | 47 |
| 2 a | 0.578 | 10.1 | 51 |
| 2 b | 0.599 | 10.2 | 60 |
| 2 c | 0.588 | 10.0 | 48 |
| 2 d | 0.579 | 10.0 | 44 |
| 2 e | 0.577 | 10.3 | 50 |
| Avg. | 0.584 | 10.1 | 51 |

This test data indicates that the MOR of these tiles (no co-calcination) was lower at higher density when compared to the same types of tiles (see Example 2) produced by co-calcining the same gypsum wallboard scrap material.

EXAMPLE 4

Tests were conducted to evaluate 100% replacement of mineral wool in a ceiling tile formulation with a gypsum/cellulose fiber (co-calcined) composite material. In order to improve the cutability of the ceiling tile, the gypsum was co-calcined with fine (hydropulped) newsprint instead of wood fibers.

Gypsum and 20% by weight of shredded paper (newsprint) were calcined in accordance with the procedure disclosed in U.S. Pat. No. 5,320,677. The shredded newsprint was soaked in water overnight, and then gypsum was added and mixed with the paper fiber slurry for at least 1 hour prior to calcining the slurry. After calcining, the excess water was removed (vacuum) and then the gypsum/paper fiber composite was dried to hemihydrate.

The following tables represent the formulations and the recorded MOR data:

TABLE 4A

| Ingredient | Formulation #1 Wt. (gms.) | Wt. % | Formulation #2 Wt. (gms.) | Wt. % | Formulation #3 Wt. (gms.) | Wt. % | Control Wt. (gms.) | Wt. % |
|---|---|---|---|---|---|---|---|---|
| Gypsum (calcined) | 142.3 | 37.2 | 142.3 | 35.4 | 142.3 | 36.3 | 0 | |
| Paper Fiber (calcined) | 30 | 7.8 | 30 | 7.5 | 30 | 7.65 | 0 | |
| Newsprint | 40 | 10.5 | 40 | 9.9 | 50 | 12.75 | | 16.0 |
| Expanded Perlite | 150 | 39.2 | 150 | 37.3 | 150 | 38.2 | | 30.0 |
| Corn Starch | 20 | 5.2 | 40 | 9.9 | 20 | 5.1 | | 5.0 |
| Mineral Fiber | 0 | | 0 | | 0 | | | 44.6 |
| Clay | 0 | | 0 | | 0 | | | 4 |
| Slurry Solids | | 7.8 | | 8.1 | | 7.4 | | |

Standard flocculant and surfactant were used in all formulations.
17 grams of gypsum was added to the slurry water to control gypsum solubility.

TABLE 4B

| Sample No. | | Thickness (inch) | Density (lbs./ft.$^3$) | MOR (psi) | Break Load (lbs.) |
|---|---|---|---|---|---|
| Form. | 1 a | 0.637 | 9.5 | 30.2 | 4.08 |
| | 1 b | 0.630 | 9.2 | 26.8 | 3.55 |
| | 1 c | 0.636 | 9.2 | 23.5 | 3.17 |
| | 1 d | 0.639 | 9.3 | 26.7 | 3.63 |
| | 1 e | 0.682 | 9.7 | 30.4 | 4.71 |
| Average | | 0.645 | 9.4 | 27.5 | 3.83 |
| Form | 2 a | 0.626 | 9.7 | 37.9 | 4.95 |
| | 2 b | 0.630 | 9.8 | 35.4 | 4.68 |
| | 2 c | 0.636 | 9.8 | 35.1 | 4.73 |
| | 2 d | 0.652 | 10.1 | 43.5 | 6.16 |
| Average | | 0.636 | 9.9 | 38.0 | 5.13 |
| Form | 3 a | 0.627 | 9.8 | 40.9 | 5.36 |
| | 3 b | 0.621 | 9.6 | 31.1 | 4.00 |
| | 3 c | 0.619 | 9.5 | 30.1 | 3.85 |
| | 3 d | 0.625 | 9.6 | 31.9 | 4.16 |
| | 3 e | 0.653 | 9.9 | 44.4 | 6.31 |
| Average | | 0.629 | 9.7 | 35.7 | 4.74 |
| Control | a | 0.593 | 11.3 | 49.5 | 5.80 |

TABLE 4B-continued

| Sample No. | Thickness (inch) | Density (lbs./ft.$^3$) | MOR (psi) | Break Load (lbs.) |
|---|---|---|---|---|
| b | 0.590 | 11.3 | 46.9 | 5.44 |
| c | 0.596 | 11.3 | 46.3 | 5.48 |
| d | 0.589 | 11.4 | 52.1 | 6.02 |
| e | 0.611 | 11.6 | 48.1 | 5.98 |
| Average | 0.596 | 11.4 | 48.6 | 5.74 |

After testing the samples for MOR strength, they were also tested for cutability using a wallboard knife. The control tiles (16% newsprint) cut clean, however, the gypsum/paper fiber tiles (17.4% newsprint) had very rough cuts.

EXAMPLE 5

Further tests were carried out to determine the effect on tile cutability by reducing the paper fiber content in the formulation and also increasing the starch content to maintain the strength of the dry tile. It was believed that reducing the paper fiber content would adversely affect the strength. The experimental ceiling tiles were made using co-calcined gypsum and paper fiber (newsprint). After calcining an 80% gypsum and 20% newsprint slurry (15% solids), the slurry was dewatered (vacuum) and dried as a hemihydrate composite material. The hemihydrate composite was evaluated as a replacement for 100% of the mineral fiber. The shredded newsprint was soaked in water overnight and the next day it was mixed with gypsum to form the 15% solids slurry for calcining.

The following tables represent the formulations and the recorded strength data:

TABLE 5A

| Ingredients | Control #1 Wt. (gms.) | Wt. % | Formula #2 Wt. (gms.) | Wt. % | Formula #3 Wt. (gms) | Wt. % | Formula #4 Wt. (gms.) | Wt. % |
|---|---|---|---|---|---|---|---|---|
| Mineral Fiber | 178.4 | 44.6 | 0 | | 0 | | 0 | |
| Expanded Perlite | 120 | 30 | 150 | 39.8 | 150 | 39.5 | 150 | 39.8 |
| Gypsum (calcined) | 0 | | 132.8 | 35.2 | 132.8 | 35.0 | 132.8 | 35.2 |
| Paper Fiber (calcined) | 0 | | 28 | 7.4 | 28 | 7.4 | 28 | 7.4 |
| Newsprint | 64 | 16 | 36 | 9.6 | 29 | 7.6 | 21 | 5.6 |
| Corn Starch | 20 | 5 | 20 | 5.3 | 35 | 9.2 | 40 | 10.6 |
| Clay | 17.6 | 4.4 | 10 | 2.7 | 5 | 1.3 | 5 | 1.3 |
| Slurry Solids | | 4.0 | | 7.0 | | 7.1 | | 7.0 |

17 grams of gypsum was added to the slurry water to control gypsum solubility.

TABLE 5B

| Sample No. | | Thickness (inch) | Density (lb./ft.$^3$) | Break Load (lbs.) | MOR (psi) |
|---|---|---|---|---|---|
| Control | 1 a | 0.601 | 11.39 | 4.17 | 46.2 |
| | 1 b | 0.592 | 11.32 | 4.88 | 55.7 |
| | 1 c | 0.586 | 11.25 | 4.27 | 49.7 |
| | 1 d | 0.586 | 11.19 | 4.2 | 48.9 |
| | 1 e | 0.577 | 11.25 | 4.5 | 54.1 |
| Average | | 0.588 | 11.28 | 4.4 | 50.9 |
| Formula | 2 a | 0.515 | 10.58 | 3.65 | 55.0 |
| | 2 b | 0.521 | 10.55 | 3.27 | 48.2 |
| | 2 c | 0.525 | 10.58 | 4.02 | 58.3 |
| | 2 d | 0.541 | 11.02 | 3.65 | 49.9 |
| Average | | 0.526 | 10.69 | 3.65 | 52.9 |

TABLE 5B-continued

| Sample No. | | Thickness (inch) | Density (lb./ft.$^3$) | Break Load (lbs.) | MOR (psi) |
|---|---|---|---|---|---|
| Formula | 3 a | 0.520 | 10.99 | 6.12 | 90.5 |
| | 3 b | 0.519 | 10.68 | 4.87 | 72.3 |
| | 3 c | 0.525 | 10.61 | 4.72 | 68.5 |
| | 3 d | 0.536 | 10.88 | 4.68 | 65.2 |
| | 3 e | 0.555 | 11.04 | 5.18 | 67.3 |
| Average | | 0.531 | 10.84 | 5.11 | 72.8 |
| Formula | 4 a | 0.538 | 10.98 | 5.53 | 76.4 |
| | 4 b | 0.517 | 10.80 | 4.18 | 62.6 |
| | 4 c | 0.519 | 10.67 | 4.25 | 63.1 |
| | 4 d | 0.519 | 10.81 | 4.05 | 60.1 |
| | 4 e | 0.547 | 11.01 | 4.73 | 63.2 |
| Average | | 0.528 | 10.85 | 4.55 | 65.1 |

The ceiling tiles were also tested for wet strength by taking samples prior to oven drying. The experimental tiles with 17% and 15% total paper fiber handled very well, similar to the control. The tile with 13% paper fiber was somewhat weaker.

It was concluded that the ceiling tiles containing 15% to 17% paper fiber, 40% expanded perlite and 10% starch binder provided processing and physical properties comparable to the mineral fiber ceiling tile.

EXAMPLE 6

The following formulations were used to compare using co-calcined gypsum/newsprint with a physical mixture of gypsum and newsprint without calcining:

TABLE 6A

| Ingredient | Control (Mineral Fiber) | Hemihydrate Composite (calcined) | Newsprint & Gypsum |
|---|---|---|---|
| Mineral Wool | 44.6% | 0 | 0 |
| Expanded Perlite | 30.0% | 40% | 40% |
| Tot. Paper Fiber(Newsprint) | 16.0% | 16% | 20–22% |
| Gypsum | 0 | 34% | 32% |
| Corn Starch | 5.0% | 10% | 7–9% |
| Clay | 4.4% | 0 | 0 |
| Flocculant | 0.06% | 0.06 | 0 |
| Surfactant | 0.08% | 0.08 | 0 |
| Slurry Solids | 4% | 7% | 7% |

In preparing the ceiling tile mats, the surfactant (when used) was added to the desired amount of water and mixed. Then the newsprint (hydropulped) was added, followed by mixing. Then the expanded perlite and mineral wool (when used) was added with continued mixing. Finally, the clay (when used) and starch was added, with continued mixing for about 3 minutes until a homogeneous slurry was formed, afterwhich the flocculant (when used) was added and mixing continued for another 15 seconds. In preparing the non-mineral wool ceiling tiles, the clay and mineral fiber were replaced with gypsum and newsprint.

The mat was formed by pouring the slurry into a Tappi Box where it was gently mixed, and thereafter there was gravity drainage and vacuum was applied to the wet mat to remove excess water. Then, the mat was wet pressed to the desired thickness (about ⅝ inch) in a static press, also removing additional excess water. The wet mat was tested for wet lap strength prior to drying. The mats were dried with steam at 600° F. for 30 minutes, followed by drying at 350° F. for 90 minutes.

It has been found that in the non-mineral wool formulation, the amount of paper fiber (newsprint) should be at least about 20% by weight for an acceptable mat formation. The formulation employing the co-calcined composite material did slightly increase the drainage time, especially at higher paper fiber content. There was no significant effect on drainage using the mixture of gypsum and newsprint even at levels as high as 22%.

The mat made with the hemihydrate composite material was easy to handle during processing and had wet lap strength comparable to the mineral fiber control, with both formulations containing 16% paper fiber. The composite material provided a mat in which the wet lap had good deflection during testing. After the testing, the wet lap break line was slightly hand pressed before drying, after which the wet lap line was completely healed. The mat made with a mixture of gypsum and newsprint generally had weaker wet lap strength, however, at a 20% newsprint level, it did have a wet lap strength comparable to the hemihydrate composite formulation at a 16% paper fiber content.

The weight retention in the tiles made with the hemihydrate composite was generally superior to the tiles made with a mixture of gypsum and newsprint. This indicates that there may have been loss of gypsum, as well as perlite segregation, in the mat formation using the mixture. As previously noted, both types of experimental tiles were harder to cut than the mineral fiber tile.

The densities of both types of experimental tiles were slightly higher than the control, due to the lower thickness of the mat. The lower thickness was the result of springback after pressing in the mineral fiber mat, whereas the gypsum/paper fiber mat did not spring back. The MOR strength of both types of experimental tiles was acceptable or better than the mineral fiber control tiles.

EXAMPLE 7

The following formulations were used to evaluate the effect on cutability of hydropulped newsprint and gypsum (uncalcined) and the same newsprint and gypsum (calcined) as a complete replacement for mineral fiber:

TABLE 7A

| | Perlite | | Starch | | Newsprint | | Gypsum | |
|---|---|---|---|---|---|---|---|---|
| Sample | Grams | Wt. % | Grams | Wt. % | Grams | Wt. % | Grams | Wt. % |
| 1 | 165 | 44 | 22.5 | 6 | 67.5 | 18 | 120 | 32 |
| 2 | 135 | 36 | 52.5 | 14 | 67.5 | 18 | 120 | 32 |
| 3 | 165 | 44 | 37.5 | 10 | 52.5 | 14 | 120 | 32 |
| 4 | 135 | 36 | 37.5 | 10 | 82.5 | 22 | 120 | 32 |
| 5 | 150 | 40 | 52.5 | 14 | 52.5 | 14 | 120 | 32 |
| 6 | 150 | 40 | 22.5 | 6 | 82.5 | 22 | 120 | 32 |
| 7 | 157.5 | 42 | 33.8 | 9 | 63.8 | 17 | 120 | 32 |
| 8 | 142.5 | 38 | 41.3 | 11 | 71.3 | 19 | 120 | 32 |

TABLE 7A-continued

| | Perlite | | Starch | | Newsprint | | Gypsum | |
|---|---|---|---|---|---|---|---|---|
| Sample | Grams | Wt. % | Grams | Wt. % | Grams | Wt. % | Grams | Wt. % |
| 9 | 153.8 | 41 | 30 | 8 | 71.3 | 19 | 120 | 32 |
| 10 | 146.3 | 39 | 45 | 12 | 63.8 | 17 | 120 | 32 |
| 11 | 153.8 | 41 | 41.3 | 11 | 60 | 16 | 120 | 32 |
| 12 | 146.3 | 39 | 33.8 | 9 | 75 | 20 | 120 | 32 |
| 13 | 150 | 40 | 37.5 | 10 | 67.5 | 18 | 120 | 32 |

12 grams of gypsum was added to the slurry water to control gypsum solubility.

All of these formulations were formed into aqueous slurries having a 7% by weight solids content. In the case of the co-calcined gypsum/newsprint, the ratio of gypsum to newsprint was 85:15, and additional newsprint was added to provide the amount of newsprint set forth in the above formulation.

In evaluating the 13 sample tiles, the following data was recorded:

TABLE 7B

| | Cutability Force | | Type of Cut | |
|---|---|---|---|---|
| Sample | Calcined | Uncalcined | Calcined | Uncalcined |
| 1 | 23.8 | 19.8 | Very Rough | Very Rough |
| 2 | 20.9 | 12.7 | Rough | Clean |
| 3 | 22.7 | 16.0 | Very Rough | Very Rough |
| 4 | 21.6 | 21.1 | Rough | Very Rough |
| 5 | 17.6 | 13.2 | Rough | Rough |
| 6 | 28.1 | 21.8 | Very Rough | Very Rough |
| 7 | 17.6 | 14.3 | Slightly Rough | Slightly Rough |
| 8 | 17.4 | 20.0 | Slightly Rough | Slightly Rough |
| 9 | 21.4 | 18.7 | Clean | Slightly Rough |
| 10 | 23.4 | 16.8 | Slightly Rough | Clean |
| 11 | 23.4 | 16.7 | Slightly Rough | Clean |
| 12 | 25.0 | 19.7 | Rough | Rough |
| 13 | 27.8 | 16.0 | Rough | Clean |

Cutability is a measure of two factors—how difficult it is to cut with a hand-held utility knife and the appearance of the cut. A two piece jig was designed to perform the cutability tests. One piece held a 3 inch by 4 inch ceiling tile sample in place and a standard utility blade was set at an angle of 30° relative to the sample in the other piece. The cutability tests were performed on an Instron Universal Testing Machine with the unit operating in a tension mode and the crosshead speed set at 20 inches/minute. This test approximates the action of cutting a tile with a hand-held utility knife. Results are reported as the force required to cut the sample and a description of the appearance of the cut.

In comparison to the difficult to cut gypsum/newsprint formulations, all of the mineral fiber tiles had a clean cut and required an average force of about 11. As a result of the difficulty in cutting the tiles containing the co-calcined gypsum/newsprint composite or the physical mixture of gypsum and paper fiber (uncalcined), a tile formulation containing at least about 10% dry weight of mineral fiber has better cutting properties than the mineral wool-free tiles.

EXAMPLE 8

A plant trial was performed using the following formulations, with the gypsum and hydropulped newsprint being physically mixed into the formulation without co-calcining:

TABLE 8A

| Ingredients & Other Factors | Formulation A | Formulation B |
|---|---|---|
| Expanded Perlite | 39% | 41% |
| Newsprint (hydropulped) | 22% | 20% |
| Gypsum | 32% | 32% |
| Starch | 7% | 7% |
| Solids Content | 5.5% | 5.5% |
| Line Speed (ft./min.) | 30 | 30–34 |

The starting line speed (Formulation A) was 30 ft./min and this was increased to 34 ft./min. during the latter part of the second trial (Formulation B). The wet mats were dried with the following dryer temperature ranges after startup:

TABLE 8B

| | Dryer #1 | Dryer #2 | Dryer #3 | Dryer #4 |
|---|---|---|---|---|
| Formulation A | 790–802° F. | 458–492° F. | 409–471° F. | 408–471° F. |
| Formulation B | 788–821° F. | 470–500° F. | 419–454° F. | 419–450° F. |

The mats exhibited no warpage after drying, and all of the dry panels passed through the trimmers. Approximately 65,000 square feet of panels were produced.

The slurry consistency in both trials was about 5.5 weight % which appeared to be acceptable. The water did not separate from the stock when poured on a smooth surface (slump test). The slurry feed rate was maintained at approximately 400 gallons/minute during both trials. The wet mat was pressed to a thickness of about 0.610 inch prior to drying which removed some of the excess water. The final density of the dried panels was about 13 pounds/cubic foot.

EXAMPLE 9

Another plant trial was performed in which 33% of the mineral fiber was replaced with gypsum and additional newsprint and a second formulation wherein all of the mineral fiber was replaced. The following formulations were used:

TABLE 9A

| Ingredient | Formulation A | Formulation B |
|---|---|---|
| Expanded Perlite | 35% | 39% |
| Newsprint (hydropulped) | 16% | 22% |
| Gypsum | 12% | 32% |
| Starch | 10% | 7% |
| Mineral Fiber | 27% | 0% |

In both trials, the starting line speed was 30 ft./minute, however, due to the use of additional dilution water, the line speed was reduced to 28 ft./min. (Formulation A) and 27 ft./min. (Formulation B). The following data was recorded:

TABLE 9B

| Sample No.* | No. of Samples | Thickness (inch) | Density (lb./ft.³) | MOR (psi) |
|---|---|---|---|---|
| 1 & 2 | 6 | 0.622 | 11.0 | 136 |
| 3 & 4 | 6 | 0.626 | 14.0 | 223 |
| 5 & 6 | 6 | 0.639 | 12.0 | 167 |
| 7, 8 & 9 | 9 | 0.614 | 12.2 | 179 |
| 10 | 3 | 0.612 | 11.5 | 159 |
| 24 & 25 | 6 | 0.607 | 13.7 | 198 |
| 11 | 3 | 0.623 | 14.8 | 259 |
| 12 | 3 | 0.636 | 14.3 | 247 |
| 13, 14 & 15 | 9 | 0.637 | 13.4 | 223 |
| 16, 17 & 18 | 9 | 0.636 | 12.8 | 204 |
| 19 & 20 | 6 | 0.618 | 13.1 | 218 |
| 21 & 22 | 6 | 0.643 | 13.7 | 233 |

*Samples 1–10 were 33% mineral fiber replacement and 11–25 were 100%.

The warpage in both trials was minimal and all panels passed through the slitters. There was also minimal calcination of the gypsum in the dryers.

During the processing, the initial slurry consistency (33% replacement) was approximately 6.6% by weight of solids. Because of the high consistency, the slurry flow was not uniform and the wet mat cracked before vacuum dewatering. The slump test patty diameter was only 6.5 inches, indicating improper flow of the slurry. Addition of dilution water solved the slurry flow problem and reduced the slurry consistency to 5.4% solids. The slump test patty diameter was 9.5 inches (normal). Later in the trial, additional dilution water lowered the consistency to 4.9% solids, with no adverse effect on the mat formation.

In the 100% mineral fiber replacement trial, the initial slurry consistency was 6.3% solids. This caused some cracking in the mat formation which was resolved by adding dilution water, lowering the consistency to 5.4% solids and providing a 9.5 inch slump test patty diameter.

EXAMPLE 10

A plant trial was run using the following formulation:

TABLE 10A

| Ingredient | Amount (wt. %) |
|---|---|
| Expanded Perlite | 43 |
| Gypsum | 32 |
| Starch | 5 |
| Paper Fiber (newsprint) | 20 |

The formulation consistency was about 5.5% solids and the gypsum/paper fiber were physically mixed into the slurry (without co-calcining). The newsprint was added as a slurry containing about 3% solids. The line speed was about 30 feet/minute, and the wet mat thickness was carefully maintained at about 0.6 inches using a combination of vacuum and pressing rolls.

The following data was recorded:

TABLE 10B

| Sample No. | Thickness (inch) | Density (lb./ft.³) | MOR (psi) |
|---|---|---|---|
| 1-a | 0.614 | 15.0 | 162 |
| 1-b | 0.617 | 14.9 | 160 |
| 1-c | 0.611 | 15.1 | 162 |
| 2-a | 0.614 | 13.1 | 127 |
| 2-b | 0.608 | 13.2 | 132 |
| 2-c | 0.607 | 13.2 | 141 |
| 3-a | 0.602 | 13.7 | 146 |
| 3-b | 0.602 | 13.6 | 145 |
| 3-c | 0.604 | 13.7 | 146 |
| 4-a | 0.607 | 12.9 | 135 |
| 4-b | 0.609 | 12.9 | 137 |
| 4-c | 0.610 | 12.9 | 137 |
| 5-a | 0.615 | 13.1 | 124 |
| 5-b | 0.605 | 13.2 | 121 |
| 5-c | 0.611 | 13.2 | 128 |
| 6-a | 0.623 | 12.4 | 142 |
| 6-b | 0.624 | 12.2 | 141 |
| 6-c | 0.624 | 12.3 | 142 |
| 7-a | 0.624 | 13.9 | 152 |
| 7-b | 0.621 | 13.9 | 159 |
| 7-c | 0.622 | 13.9 | 153 |
| 8-a | 0.626 | 13.9 | 161 |
| 8-b | 0.625 | 13.9 | 157 |
| 8-c | 0.623 | 14.0 | 162 |
| 9-a | 0.631 | 13.0 | 140 |
| 9-b | 0.624 | 13.2 | 150 |
| 9-c | 0.622 | 13.2 | 144 |
| 10-a | 0.616 | 13.0 | 146 |
| 10-b | 0.617 | 13.0 | 145 |
| 10-c | 0.622 | 13.1 | 144 |
| 11-a | 0.618 | 15.4 | 162 |
| 11-b | 0.612 | 15.6 | 171 |
| 11-c | 0.616 | 15.4 | 168 |

The tiles made with this formulation did not warp and readily passed through the slitters. The dried tiles had excellent hardness compared to mineral fiber based tiles.

Having completely described my invention in accordance with 35 U.S.C. 112,

What is claimed is:

1. A wetted, mineral wool-free composition suitable for making acoustical tiles in water-felting process consisting essentially of gypsum, cellulosic fiber, a lightweight aggregate material and a binder, in which on a dry solids basis there is at least about 15% by weight of gypsum and at least 13% by weight of cellulose fiber.

2. The composition of claim 1 in which the binder is starch and it is present on a dry solids basis in an amount ranging from about 3 to about 15% by weight.

3. The composition of claim 1 in which the lightweight aggregate material is expanded perlite and it is present on a dry solids basis in an amount of at least about 25% by weight.

4. The composition of claim 3 in which the cellulose fiber is paper fiber and it is present on a dry solids basis in an amount ranging from 13 to about 30% by weight.

5. The composition of claim 3 in which the gypsum ranges from about 15 to about 45% by weight, the expanded perlite ranges from about 25 to about 60% by weight, and the cellulose fiber is paper fiber ranging from 13 to about 30% by weight.

6. A wetted, mineral wool-free composition suitable for making acoustical tiles in a water-felting process consisting essentially of gypsum, cellulose fiber, a lightweight aggregate material and a binder in which at least a portion of the gypsum and the cellulosic fiber are in the form of a composite material which has been produced by calcining under pressure a dilute slurry of gypsum and cellulosic fiber.

7. The composition of claim 6 in which the composite material is calcium sulfate alpha hemihydrate which has been co-calcined with the cellulosic fibers.

8. The composition of claim 6 in which the cellulosic fibers are paper fibers.

9. The composition of claim 6 in which on a dry solids basis there is at least about 15% by weight of gypsum and at least 13% by weight of cellulose fiber.

10. The composition of claim 7 in which the cellulosic fibers are paper fibers.

11. The composition of claim 9 in which a portion of the cellulose fibers are added to the composition as uncalcined fibers in addition to the calcined gypsum/cellulose fiber composite material.

12. The composition of claim 9 in which the gypsum ranges from about 15 to about 45% by weight and the cellulose fiber ranges from 13 to about 30% by weight.

13. The composition of claim 12 in which the cellulosic fiber is paper and a portion of the paper fibers are added to the composition as uncalcined fibers in addition to the calcined gypsum/paper fiber composite material.

14. A wetted, mineral wool-free composition suitable for making acoustical tiles in a water-felting process consisting essentially of gypsum, cellulosic fiber, a lightweight aggregate material and a binder in which on a dry solids basis there is at least 13% by weight of cellulose fiber, and a substantial portion of the gypsum and a minor portion of the cellulose fiber are in the form of ground gypsum wallboard.

15. The composition of claim 14 in which there is at least about 15% by weight of gypsum.

16. The composition of claim 15 in which the gypsum ranges from about 15 to about 45% by weight and substantially all of the gypsum is in the form of ground gypsum wallboard.

17. The composition of claim 16 in which the cellulose fiber is paper and the major portion of the paper fiber is newsprint added to the composition to supplement the paper fiber in the ground gypsum wallboard.

18. A wetted composition suitable for making acoustical tiles in a water-felting process consisting essentially of mineral wool, gypsum, cellulosic fiber, a lightweight aggregate material and a binder, in which on a dry solids basis there is at least about 10% by weight of mineral wool, at least about 10% by weight of gypsum and at least 13% by weight of cellulose fiber.

19. The composition of claim 18 in which the binder is starch and it is present in an amount ranging from about 3 to about 15% by weight.

20. The composition of claim 18 in which the lightweight aggregate material is expanded perlite and it is present in an amount of at least about 25% by weight.

21. The composition of claim 18 in which the cellulose fiber is paper fiber and it is present in an amount ranging from 13 to about 30% by weight.

22. The composition of claim 18 in which the amount of mineral wool ranges from about 10% to about 30% by weight.

23. The composition of claim 20 in which the gypsum ranges from about 10 to about 25% by weight, the expanded perlite ranges from about 25 to about 40% by weight, and the cellulose fiber is paper fiber ranging from 13 to about 30% by weight.

24. The composition of claim 19 in which at least a portion of the gypsum and the cellulosic fiber are in the form of a composite material which has been produced by calcining under pressure a dilute slurry of gypsum and cellulosic fiber.

25. The composition of claim 19 in which a substantial portion of the gypsum and a minor portion of the cellulose fiber are in the form of ground gypsum wallboard.

26. A dry mineral wool-free acoustical tile made by a water-felting process consisting essentially of gypsum, cellulosic fiber, a lightweight aggregate material and a binder in which there is at least about 15% by weight of gypsum and at least 13% by weight of cellulose fiber.

27. The acoustical tile of claim 18 in which the binder is starch and it is present in an amount ranging from about 3 to about 15% by weight.

28. The acoustical tile of claim 20 in which the expanded perlite is present in an amount of at least about 25% by weight.

29. The acoustical tile of claim 20 in which the cellulose fiber is paper fiber and it is present in an amount ranging from 13 to about 30% by weight.

30. The acoustical tile of claim 20 in which the gypsum ranges from about 20 to about 40% by weight, the expanded perlite ranges from about 25 to about 50% by weight, and the cellulose fiber is paper fiber ranging from 13 to about 30% by weight.

31. A dry mineral wool-free acoustical tile made by a water-felting process consisting essentially of gypsum, cellulosic fiber, a lightweight aggregate material and a binder in which at least a portion of the gypsum and the cellulosic fiber are in the form of a composite material which has been produced by calcining under pressure a dilute slurry of gypsum and cellulosic fiber.

32. The acoustical tile of claim 31 in which there is at least about 15% by weight of gypsum and at least 13% by weight of cellulose fiber.

33. The acoustical tile of claim 32 in which the cellulosic fibers are paper fibers.

34. The acoustical tile of claim 32 in which a portion of the cellulose fibers are uncalcined paper fibers in addition to the calcined gypsum/cellulose fiber composite material.

35. The acoustical tile of claim 32 in which the gypsum ranges from about 15 to about 45% by weight and the cellulose fiber ranges from 13 to about 30% by weight.

36. An acoustical tile made by a water-felting process consisting essentially of mineral wool, gypsum, cellulosic fiber, a lightweight aggregate material and a binder in which there is at least about 10% by weight of mineral wool, at least about 10% by weight of gypsum and at least 13% by weight of cellulose fiber.

37. The acoustical tile of claim 36 in which the binder is starch and it is present in an amount ranging from about 3 to about 15% by weight.

38. The acoustical tile of claim 36 in which the lightweight aggregate material is expanded perlite and it is present in an amount of at least about 25% by weight.

39. The acoustical tile of claim 36 in which the cellulose fiber is paper fiber and it is present in an amount ranging from 13 to about 30% by weight.

40. The acoustical tile of claim 36 in which the amount of mineral wool ranges from about 10% to about 30% by weight.

41. The acoustical tile of claim 38 in which the gypsum ranges from about 10 to about 25% by weight, the expanded perlite ranges from about 25 to about 40% by weight, and the cellulose fiber is paper fiber ranging from 13 to about 30% by weight.

42. The acoustical tile of claim 41 in which at least a portion of the gypsum and the cellulose fiber are in the form of a composite material which has been produced by calcining under pressure a dilute slurry of gypsum and cellulosic fiber.

* * * * *